(12) United States Patent
Tholen et al.

(10) Patent No.: US 12,466,147 B2
(45) Date of Patent: Nov. 11, 2025

(54) PRESSING TOOL, WORKPIECE, METHOD FOR PRODUCING A PRESSING TOOL, AND METHOD FOR PRODUCING A WORKPIECE

(71) Applicant: HUECK Rheinische GmbH, Viersen (DE)

(72) Inventors: Berthold Tholen, Viersen (DE); Jorg Albrecht, Viersen (DE); Thorsten Hagedorn, Viersen (DE)

(73) Assignee: HUECK Rheinische GmbH, Viersen (DE)

( * ) Notice: Subject to any disclaimer, the term of this patent is extended or adjusted under 35 U.S.C. 154(b) by 670 days.

(21) Appl. No.: 17/640,700

(22) PCT Filed: Sep. 2, 2020

(86) PCT No.: PCT/EP2020/025398
§ 371 (c)(1),
(2) Date: Mar. 4, 2022

(87) PCT Pub. No.: WO2021/043445
PCT Pub. Date: Mar. 11, 2021

(65) Prior Publication Data
US 2022/0347957 A1    Nov. 3, 2022

(30) Foreign Application Priority Data

Sep. 6, 2019   (DE) .................... 10 2019 124 004.2

(51) Int. Cl.
*B30B 15/06* (2006.01)
*B44B 5/02* (2006.01)
*B44C 1/22* (2006.01)

(52) U.S. Cl.
CPC ............ *B30B 15/062* (2013.01); *B44B 5/026* (2013.01); *B44C 1/228* (2013.01)

(58) Field of Classification Search
CPC ... B30B 15/0672; B30B 15/062; B44B 5/026; B44C 1/228; B44F 1/02
See application file for complete search history.

(56) References Cited

U.S. PATENT DOCUMENTS 947,548 A * 1/1910 Lind ...................... E02D 3/068
                                                  404/133.1
3,565,351 A * 2/1971 Ross, Jr. ............... B65F 1/1405
                                                  173/90
(Continued)

FOREIGN PATENT DOCUMENTS

BE   1016347 A3   8/2006
DE   3120351 C1   12/1982
(Continued)

OTHER PUBLICATIONS

International Search Report and Written Opinion for International Patent Application No. PCT/EP2020/025398 issued on Feb. 2, 2021.

*Primary Examiner* — Jimmy T Nguyen
(74) *Attorney, Agent, or Firm* — FisherBroyles, LLP (57) ABSTRACT

The disclosure relates to a pressing tool which has a structured pressing surface which is provided for producing, by pressing, a workpiece having a structured surface. At least one region of the pressing surface has a peg-shaped and/or rod-shaped structure with pegs and/or rods protruding from the pressing surface. The disclosure also relates to a workpiece which comprises a structured surface. At least one region of the structured surface comprises crater-shaped recesses in the structured surface, in order to confer a relatively matte impression on this region.

14 Claims, 5 Drawing Sheets

(56) References Cited

U.S. PATENT DOCUMENTS

| | | | |
|---|---|---|---|
| 4,110,152 A | 8/1978 | Dunning et al. | |
| 7,169,457 B2 * | 1/2007 | Suto | D21H 27/001 428/141 |
| 2008/0251191 A1 | 10/2008 | Schafer | |
| 2019/0248068 A1 | 8/2019 | Kesper | |

FOREIGN PATENT DOCUMENTS

| | | |
|---|---|---|
| DE | 102004016614 A1 | 10/2005 |
| DE | 102007055053 A1 | 5/2009 |
| DE | 102012107827 A1 | 2/2014 |
| DE | 102015009786 A1 | 2/2017 |
| EP | 2123476 B1 | 11/2009 |
| EP | 2289708 B1 | 12/2011 |
| WO | 2005095108 A2 | 10/2005 |
| WO | 2009062488 A2 | 5/2009 |
| WO | 2014029868 A1 | 2/2014 |

\* cited by examiner

PRESSING TOOL, WORKPIECE, METHOD FOR PRODUCING A PRESSING TOOL, AND METHOD FOR PRODUCING A WORKPIECE

CROSS-REFERENCE TO RELATED APPLICATIONS

This application is a U.S. National phase based on, and claiming priority to, PCT/EP2020/025398, filed on Sep. 2, 2020 entitled "PRESSING TOOL, WORKPIECE, METHOD FOR PRODUCING A PRESSING TOOL, AND METHOD FOR PRODUCING A WORKPIECE," which is based on and claims priority to German Patent Application No. 10 2019 124 004.2, filed on Sep. 6, 2019, each of which is hereby incorporated by reference in its entirety.

BACKGROUND

The disclosure relates to a pressing tool having a structured pressing surface, a workpiece, in particular a material board or a material web having a structured surface, a method for producing the pressing tool and a method for producing the workpiece.

DE 10 2007 055 053 A1 discloses a pressing plate, which comprises a structured pressing surface with multiple degrees of gloss. The structured surface comprises a structure that has a mountain-like surface with valleys and heights. By means of the pressing plate and/or its pressing surface, material boards, such as laminates, can be produced, whereby the material boards comprise structured surfaces having multiple degrees of gloss, said surfaces being assigned to the pressing surface.

EP 2 289 708 B1 discloses a method for producing a surface structure of a metallic pressed sheet, continuous ribbon or a cylindrical embossing roller with the aid of a laser.

It is the object of the present disclosure to indicate an alternative pressing tool having a structured pressing surface which is provided for producing, by pressing, a workpiece, in particular a material board, having a structured surface, such that at least one region of the structured surface appears relatively matte.

The object of the disclosure is achieved by a pressing tool, comprising a structured pressing surface, which is provided for producing a workpiece with a structured surface by pressing, wherein at least one region of the pressing surface has a peg-shaped and/or rod-shaped structure with pegs and/or rods protruding from the pressing surface.

The pressing tool according to the disclosure, which for example is an endless belt having the structured pressing surface, a pressure roller having the structured pressing surface or preferably a pressing plate having the structured pressing surface, is embodied such that at least one region of the pressing surface comprises the peg-shaped and/or rod-shaped structure. This region thus comprises a structure with multiple pegs and/or rods which protrude from the pressing surface.

The pressing tool is provided for producing workpieces having a structured surface.

The workpiece in particular is a material board having the structured surface or a material web having the structured surface.

The workpiece, e.g. the material board, is produced in particular in that a surface of a base material board is pressed with the pressing surface of the pressing tool according to the disclosure. Thereby, the material board having the structured surface, which corresponds to the structured pressing surface, is created, i.e. the structured surface comprises at least one region having crater-shaped recesses, said region corresponding to the peg-shaped and/or rod-shaped structured region of the pressing surface. The crater-shaped recesses originate by the pegs and/or rods of the peg-shaped and/or rod-shaped structured region being pressed into the surface of the base material board.

The structured surface of the workpiece in particular is a structured decor surface. It can be unicolored, in particular black or white, or multi-colored.

A further aspect of the disclosure thus relates to a workpiece, in particular a material board or a material web, having a structured surface, which has at least one region comprising crater-shaped recesses to confer a relatively matte impression on this region. The workpiece according to the disclosure in particular produced using the pressing tool according to the disclosure by pressing a surface of a base workpiece with the pressing surface of the pressing tool according to the disclosure.

Since the structured surface of the workpiece according to the disclosure has the region with the crater-shaped recesses, this region absorbs at least a part of the incident light, which creates the conditions for this area to appear relatively matte, if not even deep black, compared to the rest of the structured surface.

The workpiece according to the disclosure, which is embodied as a material board, is used, for example, as laminate for floor coverings, as front surface of furniture, etc. The material board comprises, for example, a carrier of a synthetic resin or of a natural material, such as wood. The carrier, for example, is an MDF board or a chipboard or a sheet of paper soaked in a synthetic resin. The decor surface can, for example, be provided with a pattern and/or be embodied to be colored or multicolored. The material board in particular forms a decor material board. The material board may also be a so-called luxury vinyl tile (LVT).

The workpiece which is, for example, embodied as a material web may comprise multiple plastic material layers and/or webs which are welded together by temperature and structured in particular using a cooled embossing roller as the pressing tool.

The peg-shaped and/or rod-shaped structure of the pressing surface may be embodied uniformly. To achieve that the region of the structured surface, decor surface, appears as matte as possible, the peg-shaped and/or rod-shaped structure preferably is an irregularly embodied peg-shaped and/or rod-shaped structure.

Accordingly, the crater-shaped recesses of the structured surface can be embodied uniformly. In order for the region of the structured surface to appear as matte as possible, preferably, the crater-shaped recesses are irregularly embodied crater-shaped recesses.

The structured surface is preferably produced by pressing using the pressing surface of the pressing tool according to the disclosure. To make it as easy as possible to remove the pressing surface from the structured surface after pressing, the pegs and/or rods are preferably embodied without undercuts.

According to a preferred embodiment of the pressing tool according to the disclosure, the pegs and/or rods have a relatively small height of 1 µm to 50 µm. The crater-shaped recesses of the structured surface of the workpiece according to the disclosure preferably have a depth of 1 µm to 50 µm. This results in that the crater-shaped recesses are barely recognizable as such to the naked eye, if at all, and only the matte impression of the region of the structured surface is perceived.

According to a further preferred embodiment of the pressing tool according to the disclosure, the density per area of the pegs and/or rods amounts to between $10^9$ per $cm^2$ and $6.25$ times $10^4$ per $cm^2$. The crater-shaped recesses of the structured surface of the workpiece according to the disclosure preferably have a density of between $10^9$ per $cm^2$ and $6.25$ times $10^4$ per $cm^2$. This relatively high density allows for the region of the structured surface to be embodied such that the crater-shaped recesses are barely recognizable as such to the naked eye, if at all, and only the matte impression of the region of the structured surface is perceived.

The height of the pegs and/or rods is preferably larger than the maximum diameter of their cross-sectional surfaces. The depth of the recesses is preferably larger than the maximum diameter of their cross-sectional surfaces.

By means of a predetermined density and/or height of the pegs and/or rods and/or a ratio of the height of the pegs and/or rods to the maximum diameter of the cross-sectional surface greater than 1.0 and/or by means of a predetermined density and/or depth of the crater-shaped recesses and/or a ratio of the depth of the recesses to the maximum diameter of the cross-sectional surface greater than 1.0, it is possible, for example, to specify the degree of desired mattness of the area. This means that the density of the pegs and/or rods and/or the peg-shaped recesses is preferably selected depending on the mattness of the region of the pressing surface and/or structured surface to be achieved.

The pegs and/or rods of the pressing surface of the pressing tool according to the disclosure are embodied, for example, so as to be conical, cone-shaped, pyramid-shaped, truncated pyramid-shaped and/or cuboid-shaped. The parts of the pegs and/or rods facing away from the pressing surface can be rounded.

The crater-shaped recesses of the structured surface are preferably peg-shaped and/or rod-shaped, in particular conical, pyramid-shaped, cuboid-shaped and/or have, in particular, rounded surfaces.

The pressing surface can, for example, be produced using a laser. Thus, an aspect of the disclosure relates to a method for producing the pressing tool according to the disclosure comprising controlling a laser such that it removes material from the pressing surface in order to produce the region of the pressing surface that has the peg-shaped and/or rod-shaped structure.

According to a preferred variant of the pressing tool according to the disclosure, the pressing surface can have a base structure which is at least indirectly superimposed by the peg-shaped and/or rod-shaped structure in the region.

Thus, according to a variant, the pressing surface of the pressing tool can have a base structure which is superimposed by the peg-shaped and/or rod-shaped structure in the region. A wear layer can be arranged on the base structure with the superimposed peg-shaped and/or rod-shaped structure. The wear layer is preferably made of metal, such as chromium.

However, it is also possible that the wear layer is arranged on the base structure, and that the region with the peg-shaped and/or rod-shaped structure is arranged in the wear layer.

Accordingly, according to a preferred variant of the workpiece according to the disclosure, its structured surface can have a base structure which is superimposed by the crater-shaped recesses in the region. In this regard, the overall appearance of the structuring of the workpiece is determined by the base structure. It appears more matte in the region in which the base structure is superimposed by the crater-shaped recesses.

The pressing surface is associated in particular with a natural material, such as wood or stone, and is determined in particular essentially by the base structure. In order to obtain the base structure of the pressing surface, it may be provided that a template, for example a piece of wood or a stone, is scanned to obtain image data. This image data includes, in particular, information about the base structure that the pressing surface is to have. The image data obtained by scanning can, for example, be edited manually to obtain image data assigned to the base structure of the pressing surface.

According to a variant of the method for producing the pressing tool the pressing surface of which has this base structure, which is superimposed at least indirectly by the peg-shaped and/or rod-shaped structure in the region, the method comprises controlling the laser depending on image data assigned to the base structure. In this regard, it may, for example, be provided that the laser arranges the peg-shaped and/or rod-shaped structure in the wear layer or directly in the base structure, which is optionally subsequently provided with a wear layer. Based on controlling the laser depending on the image data, it is allowed for in a relatively easy manner that the base structure is superimposed with the peg-shaped and/or rod-shaped structure in a targeted manner.

According to a preferred embodiment of the pressing tool according to the disclosure, it is provided that multiple regions of the pressing surface have a peg-shaped and/or rod-shaped structure with pegs and/or rods protruding from the pressing surface and differing in their nature such that the regions appear differently matte.

The nature of the pegs and/or rods inter alia comprises their height, density and/or type of the pegs and/or rods or of the ratio of the height of the pegs and/or rods to the maximum diameter of the cross-sectional surface.

Accordingly, according to a preferred embodiment of the workpiece according to the disclosure, it is provided that multiple regions of the structured surface have crater-shaped recesses, which differ in their nature such that the regions appear differently matte.

The nature of the recesses comprises, inter alia, their depth, density or of the ratio of the depth of the recesses to the maximum diameter of the cross-sectional surface.

BRIEF DESCRIPTION OF THE DRAWINGS

Exemplary embodiments of the disclosure are shown in the enclosed schematic drawings. The figures show FIG. 1 a material board having a structured decor surface, FIG. 2 a cutout from the decor surface with a region comprising crater-shaped recesses, FIG. 3 embodiments of the crater-shaped recesses, FIG. 4 a base material board, FIG. 5 a pressing tool with a structured pressing surface, FIG. 6 a cutout of the pressing surface with a peg-shaped and/or rod-shaped structured region, FIG. 7 embodiments of the peg-shaped and/or rod-shaped structuring, and FIG. 8 a device for producing the pressing tool.

DETAILED DESCRIPTION

Figure 1:
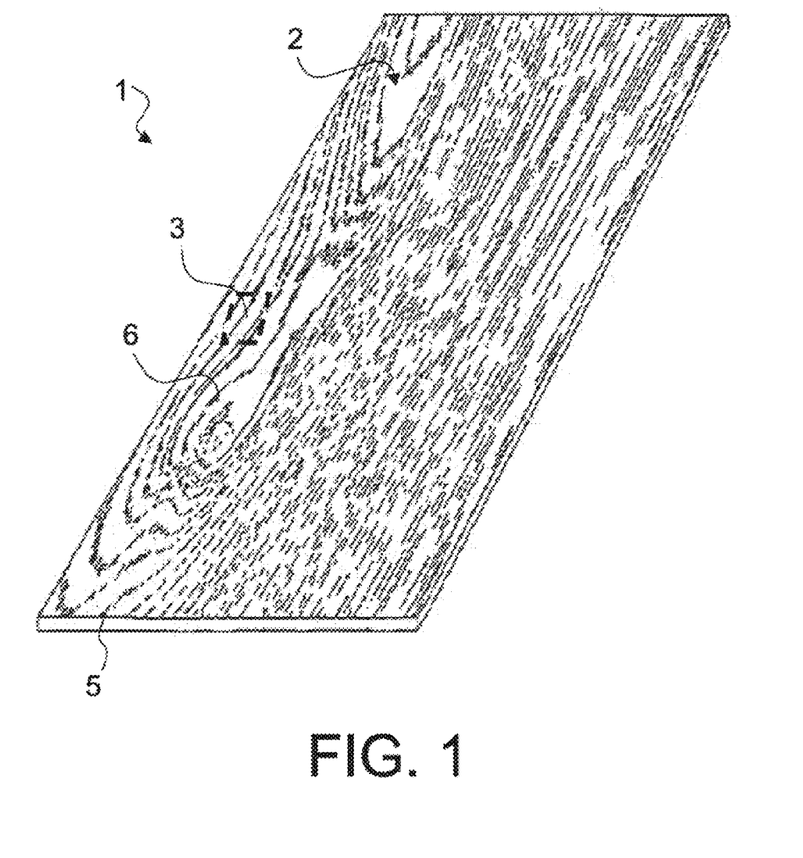

FIG. 1 shows a material board 1, which comprises a structured surface, in particular a structured decor surface 2, as an example of a workpiece having a structured surface. The decor surface 2 can be unicolored or multicolored and/or be provided with a pattern.

The material board 1 comprises, for example, a carrier 5 with the decor surface 2. The carrier 5 is, e.g., made of synthetic resin or of a natural material, such as wood. The carrier 5, e.g., is a medium-density fiberboard or a chipboard. The material board 1 comprises, for example, a paper soaked in a synthetic resin.

Figure 2:
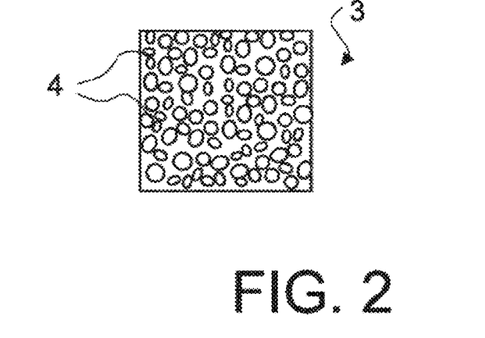
Figure 3:
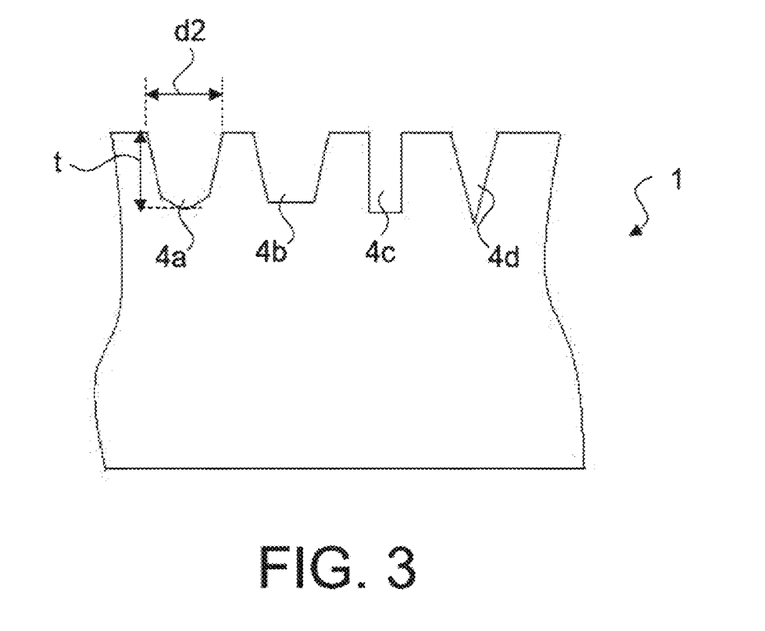

The decor surface 2 comprises a region 3 which is provided with crater-shaped recesses 4. A cutout of the decor surface 2, which shows this region 3, is shown in a top view in FIG. 2. FIG. 3 shows a sectional view of multiple embodiments of the crater-shaped recesses 4. The crater-shaped recesses 4 are preferably peg-shaped and/or rod-shaped, in particular conical, pyramid-shaped, truncated pyramid-shaped, cone-shaped, cuboid-shaped and/or have, in particular, rounded surfaces.

An example of a crater-shaped recess having a rounded surface is provided with reference number 4a in FIG. 3. An example of a truncated pyramid-shaped recess is provided with reference number 4b in FIG. 3. An example of a cuboid-shaped recess is provided with reference number 4c in FIG. 3. An example of a cone-shaped or conical recess is provided with reference number 4d in FIG. 3.

The crater-shaped recesses 4 provide the decor surface 2 with a more matte appearance in this region 3.

The decor surface 2 may be smooth for the most part and structured only in the region 3.

In the case of the present exemplary embodiment, the decor surface 2 has a base structure 6. In the region 3, the crater-shaped recesses 4 superimpose this base structure 6. The base structure 6 is, for example, assigned to a natural material, such as wood or natural stone.

The decor surface 2 may have precisely one region 3 having the crater-shaped recesses 4 or multiple regions 3 having crater-shaped recesses 4. The crater-shaped recesses 4 of the different regions 3 can differ, such that the corresponding regions 3 appear differently matte. Different degrees of mattness can, for example, be achieved by the depth t of the crater-shaped recesses 4, by different densities of the crater-shaped recesses 4 per area of the corresponding region 3 or by their arrangement. Preferably, the crater-shaped recesses 4 are arranged irregularly.

The crater-shaped recesses of the decor surface 2, for example, comprise a depth t of 1 μm to 50 μm.

The density of the crater-shaped recesses per area amounts, for example, to between $10^9$ per cm$^2$ and $6.25$ times $10^4$ per cm$^2$.

The depth t of the recesses is in particular larger than the maximum diameter d2 of their cross-sectional surfaces.

Figure 4:
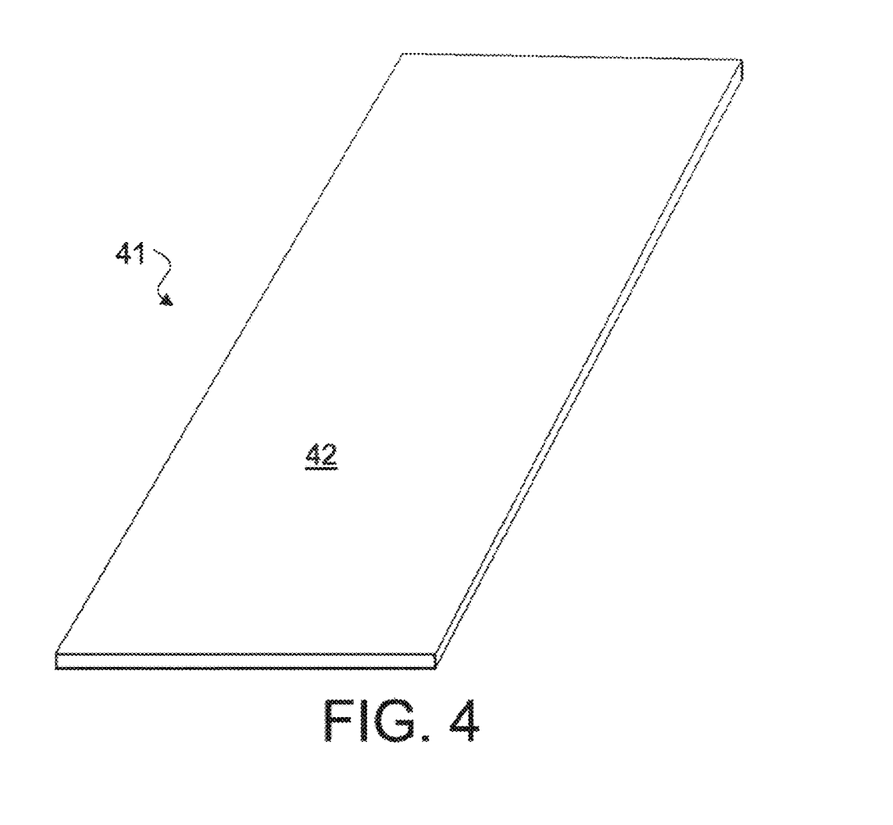

The material board 1 may, for example, be produced using a base material board 41 shown in FIG. 4. The base material board 41 comprises a surface 42. The structured decor surface 2 can be produced, for example, by pressing the surface 42 with a structured pressing surface of a pressing tool, which, for example, is an endless belt or an embossing roller, whereby the material board 1 is created.

Figure 5:
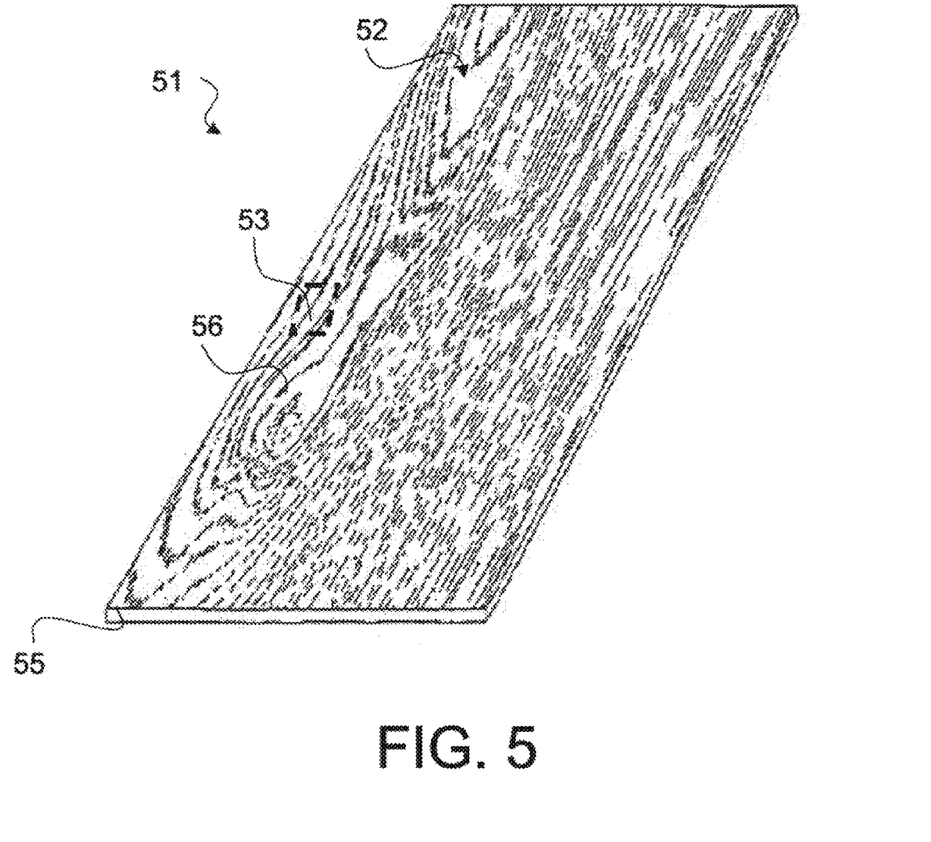

FIG. 5 shows a pressing tool in the form of a pressing plate 51 which comprises a structured pressing surface 52. The pressing plate 51 is, in particular, provided for producing the material board 1.

Figure 6:
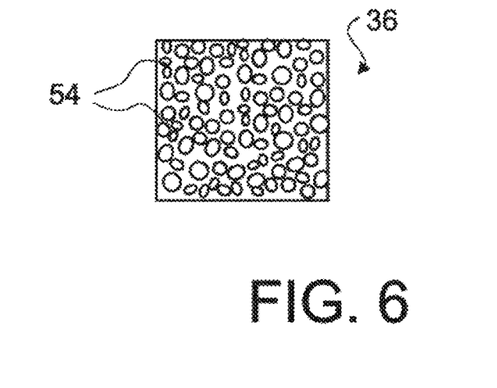
Figure 7:
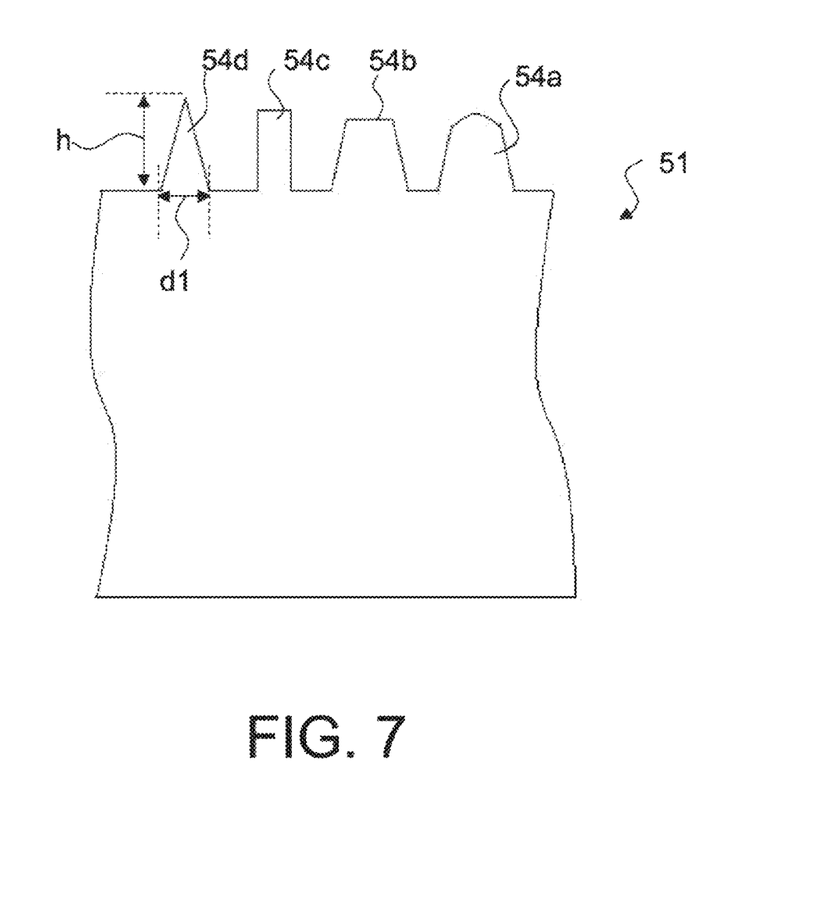

The pressing surface 52 comprises a region 53 which has a peg-shaped and/or rod-shaped structure 54 with pegs and/or rods protruding from the pressing surface 52. A cutout of the pressing surface 52, which shows this region 53, is shown in a top view in FIG. 6. FIG. 7 shows a sectional view of multiple embodiments of the pegs and/or rods. The pegs and/or rods are embodied so as to be, for example, conical, pyramid-shaped, truncated pyramid-shaped, cone-shaped and/or cuboid-shaped. The parts of the pegs and/or rods facing away from the pressing surface 52 can be rounded.

An example of pegs and/or rods having rounded surfaces is provided with reference number 54a in FIG. 7. An example of pyramid-shaped pegs and/or rods is provided with reference number 54b in FIG. 7. An example of cuboid-shaped pegs and/or rods is provided with reference number 54c in FIG. 7. An example of conical or cone-shaped pegs and/or rods is provided with reference number 54d in FIG. 7.

The pressing surface 52 may be smooth for the most part and structured only in the region 53.

In the case of the present exemplary embodiment, the pressing surface 52 has a base structure 56 which is assigned to the base structure 6 of the decor surface 2. In the region 53, the peg-shaped and/or rod-shaped structure 54 superimposes this base structure 56.

The pressing surface 52 may have precisely one region 53 having the peg-shaped and/or rod-shaped structure 54 or multiple regions 53 having a peg-shaped and/or rod-shaped structure 54. The peg-shaped and/or rod-shaped structures 54 of the different regions 54 can differ from one another. For example, the heights h of the pegs and/or rods of the peg-shaped and/or rod-shaped structures 54 or their densities per area of the corresponding region 53 can differ or by their arrangement. Preferably, the pegs and/or rods are arranged irregularly.

The pegs and/or rods for example have a height h of 1 μm to 50 μm.

The density of the pegs and/or rods per area amounts, for example, to between $10^9$ per cm$^2$ and $6.25$ times $10^4$ per cm$^2$.

The height h of the pegs and/or rods is preferably larger than the maximum diameter d1 of their cross-sectional surface.

The pegs and/or rods are, in particular, embodied without undercuts.

In the case of the present exemplary embodiment, the pressing plate 51 comprises a wear layer 55, in particular made of metal, which is arranged above the base structure 54.

The pressing tool 51 can be embodied such that the base structure 56 is superimposed by the peg-shaped and/or rod-shaped structure 54 in the region 53, and a wear layer 55 is arranged on the base structure 56 having the superimposed peg-shaped and/or rod-shaped structure 54.

The pressing tool 51 can be embodied such that the wear layer 55 is arranged on the base structure 56, in which the region 53 having the peg-shaped and/or rod-shaped structure 54 is arranged.

Figure 8:
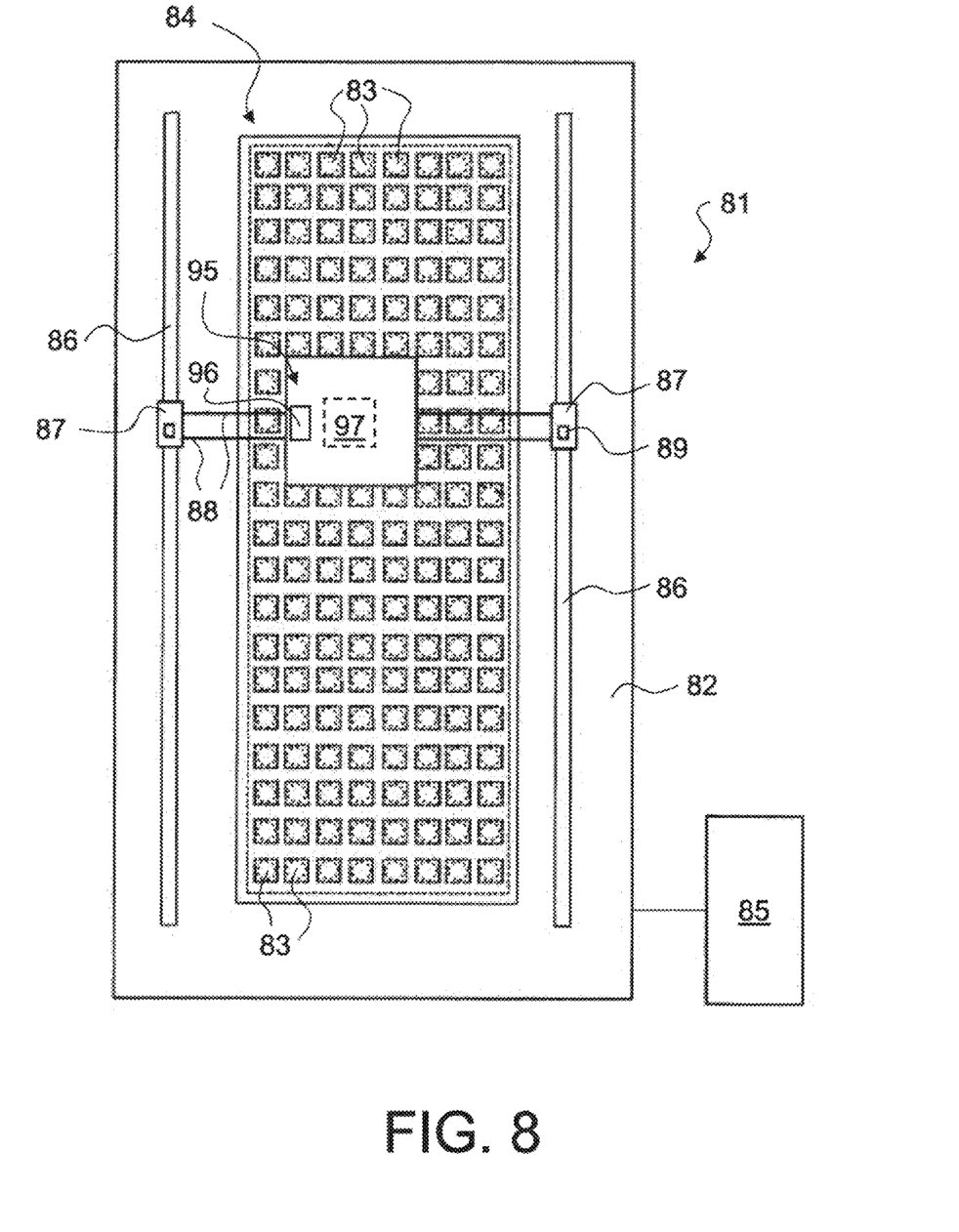

FIG. 8 shows a top view of an example of a device 81 which is configured to produce at least the region 53 of the pressing surface 52. The base structure 56 of the pressing surface 52 can also be produced by this device 81 or, for example, by means of etching according to the teaching of DE 10 2007 055 053 A1.

In the case of the present exemplary embodiment, the device 81 shown in FIG. 8 comprises a support table 82 which has a support surface 84 made of multiple individual planar surfaces 83. To produce the pressing plate 51, it is placed on the support surface 82 such that the pressing surface 52 faces away from the support surface 84.

In the case of the present exemplary embodiment, the device 81 comprises an electronic controller 85 which controls the operation of the device 81.

In the case of the present exemplary embodiment, suction orifices, which draw the pressing plate 51 onto the planar surfaces 83 by means of a vacuum pump of the device 81, said vacuum pump not being shown and controlled by the electronic controller 85, are formed in the planar surfaces 83, whereby the pressing plate 51 is fixed on the support surface 84.

In the case of the present exemplary embodiment, the device 81 comprises guide rails 86 which are arranged in longitudinal direction of the support surface 84 and next to the support surface 84.

The device 81, in particular, comprises sliding guides 87 which are mounted so as to be displaceable along the guide rails 86.

The device 81 comprises transverse rails 88 which are in particular directed transversely to the support surface 84 and which are each connected to the sliding guides 87 on their ends.

The device 81 further comprises a laser device 95 which is mounted so as to be displaceable along the transverse rails 89. The laser device 95 comprises a laser 97 which can be controlled by the electronic controller 85.

In the case of the present exemplary embodiment, the device 81 comprises an electrical drive 89 which is configured to move the sliding guides 87 and thus the transverse rails 88 and/or the laser device 95 along the guide rails 86 and thus in longitudinal direction of the support surface 84, controlled by the electronic controller 85.

In the case of the present exemplary embodiment, the device 81 comprises a further electrical drive 96 which is configured to move the laser device 95 along the transverse rails 88 and thus transversely to the support surface 84, controlled by the electronic controller 85.

The device 81 is embodied such that the pressing plate 51 fixed on the support surface 84 is arranged between the support surface 84 and the laser device 95 and/or the laser 97.

Thus, it is possible that the laser 97 is moved to the desired position relative to the pressing surface 52 to be processed, such that the laser 97 can process it as desired, controlled by the electronic controller 85.

In the case of the present exemplary embodiment, the device 81 is configured to process the pressing plate 52 fixed on the support surface 84 in that the electronic controller 85 controls the laser 97 such that it provides the region 53 of the pressing surface with the peg-shaped and/or rod-shaped structure 54.

What is claimed is:

1. A pressing tool comprising a structured pressing surface which is provided for producing, by pressing a workpiece having a structured surface wherein at least one region of the pressing surface has a peg-shaped structure with pegs protruding from the pressing surface at a height of 1 µm to 50 µm,
wherein the pegs have a density per area between $6.25 \times 10^4$ pegs per cm$^2$ and $10^9$ pegs per cm$^2$, the height of the pegs is larger than a maximum diameter of their cross-sectional surface.

2. The pressing tool as claimed in claim 1, wherein the peg-shaped structure is an irregularly embodied peg-shaped structure, or the pegs are embodied without undercuts.

3. The pressing tool as claimed in 1, wherein the pegs are configured so as to be conical, pyramid-shaped, or cuboid-shaped, and/or the parts of the pegs facing away from the pressing surface are rounded.

4. The pressing tool according to claim 1, wherein the pressing surface has a base structure which is at least indirectly superimposed by the peg-shaped structure in the region.

5. The pressing tool according to claim 1, wherein one of: the pressing surface comprises a base structure, which is superimposed by the peg-shaped structure in the region, and a wear layer is arranged on the base structure having the superimposed peg-shaped structure, or
the pressing surface comprises a base structure and a wear layer which is arranged on the base structure and in which the region having the peg-shaped structure is arranged.

6. The pressing tool according to claim 1, wherein multiple regions of the pressing surface have a peg-shaped structure with pegs protruding from the pressing surface which differ in their nature such that the regions appear differently matte.

7. The pressing tool as claimed in claim 1, wherein the workpiece is a floor tile.

8. The pressing tool according to claim 5, wherein the wear layer is made of metal.

9. A pressing tool comprising a structured pressing surface which is provided for producing a workpiece, the workpiece having a structured surface, wherein a region of the pressing surface has:
a peg-shaped structure with pegs protruding from the pressing surface,
a height of the peg-shaped structure ranges from 1 µm to 50 µm,
wherein the pegs have a density per area between $6.25 \times 10^4$ pegs per cm$^2$ and $10^9$ pegs per cm$^2$, the height of the pegs is larger than a maximum diameter of their cross-sectional surface.

10. The pressing tool as claimed in claim 9, further comprising a plurality of peg structures protruding from the pressing surface.

11. The pressing tool as claimed in claim 9, wherein the peg-shaped structure is irregularly configured, or the peg is embodied without undercuts.

12. The pressing tool as claimed in claim 9, wherein the peg is configured to be conical-shaped, pyramid-shaped, or cuboid-shaped.

13. The pressing tool as claimed in claim 9, wherein the workpiece is a floor tile.

14. A pressing tool comprising a structured pressing surface which is provided for producing a workpiece, by pressing a workpiece having a structured surface,
wherein at least one region of the pressing surface has a peg-shaped structure with a plurality of pegs protruding from the pressing surface,
wherein the pegs are configured so as to be one of conical, pyramid, cuboid, rounded shaped,
wherein the pegs have a height of 1 µm to 50 µm,
wherein the workpiece is flooring tile,
wherein the pegs have a density per area between $6.25 \times 10^4$ pegs per cm$^2$ and $10^9$ pegs per cm$^2$, the height of the pegs is larger than a maximum diameter of their cross-sectional surface.

* * * * *